US006739030B2

(12) United States Patent
Miles

(10) Patent No.: US 6,739,030 B2
(45) Date of Patent: May 25, 2004

(54) ARROW EXTRACTOR DEVICE AND METHOD

(76) Inventor: Wendell R. Miles, HCR 3, Box 3998, Willcox, AZ (US) 85643

( * ) Notice: Subject to any disclaimer, the term of this patent is extended or adjusted under 35 U.S.C. 154(b) by 90 days.

(21) Appl. No.: 10/039,824

(22) Filed: Oct. 22, 2001

(65) Prior Publication Data

US 2003/0074776 A1 Apr. 24, 2003

(51) Int. Cl.[7] .......................... B23P 19/00; B60F 13/00
(52) U.S. Cl. ...................... 29/426.5; 29/426.1; 254/131
(58) Field of Search ............................ 29/426.5, 426.1, 29/267, 282; 254/131, 129, 130

(56) References Cited

U.S. PATENT DOCUMENTS

| | | | | |
|---|---|---|---|---|
| 3,826,471 A | | 7/1974 | Orton et al. | 254/131 |
| 5,102,100 A | * | 4/1992 | Troncoso, Jr. | 254/129 |
| 5,205,541 A | | 4/1993 | Roberts et al. | 254/131 |
| 5,301,924 A | * | 4/1994 | Kammerer | 254/131 |
| 5,445,424 A | * | 8/1995 | Binette | 294/1.1 |
| 5,546,621 A | | 8/1996 | Bulot | 7/138 |

* cited by examiner

*Primary Examiner*—John C. Hong
(74) *Attorney, Agent, or Firm*—Antonio R. Durando; Durando Birdwell & Janke, PLC

(57) ABSTRACT

An arrow extraction device includes a clamp and a lever-actuated push rod. An arrow shaft is held by the clamp while removal force is applied through the lever-actuated push rod, thereby facilitating easy recovery of a whole arrow embedded in a target.

13 Claims, 2 Drawing Sheets

ARROW EXTRACTOR DEVICE AND METHOD

FIELD OF THE INVENTION

This invention relates generally to auxiliary tools or devices for archery. In particular it relates to tools or devices for extraction of arrows from foam targets.

DESCRIPTION OF THE RELATED ART

There has always been a need in archery for tools to extract arrows from targets without breaking the shaft. The development of more powerful bows and deeply penetrating arrowheads has merely increased this need. When the arrowhead is fully embedded in a target, manual removal of the arrow is difficult. In such instances, arrow extraction risks breaking the shaft, is time-consuming and requires substantial force.

Arrow and arrowhead extractors are known in the art. Orton et al., U.S. Pat. No. 3,826,471, disclose a gripping tool for extraction of exposed arrowheads. Roberts et al., U.S. Pat. No. 5,205,541, disclose a device for extracting arrowheads embedded in the target. Roberts' extractor engages threaded arrowheads manufactured for engagement of threaded, receiving shafts. Accordingly, Roberts' extractor device is used after first unscrewing the arrow shaft from the embedded arrowhead and then inserting the extractor into the target and screwing the device onto the embedded arrowhead. Bulot, U.S. Pat. No. 5,546,621, discloses a manual device that grips the arrow shaft and manually removes the arrow from foam targets.

While these devices fulfill their respective, particular objective and requirements, the aforementioned patents do not describe a device that will amplify the removal force to extract a deeply embedded arrow, one without the arrowhead exposed, from a foam target or other object.

BRIEF SUMMARY OF THE INVENTION

The invention relates in general to an arrow extraction device that includes a clamping means and a lever-actuated push rod. An arrow shaft is held by the clamping means while removal force is applied through the lever-actuated push rod, thereby facilitating easy recovery of a whole arrow embedded in a target.

Thus, the arrow extractor according to the present invention substantially departs from the conventional concepts and designs of the prior art by providing an apparatus that rapidly and with little effort extracts a whole arrow from the target object, i.e. without unscrewing or detaching the shaft from the embedded arrowhead. Hence, the risk of breaking the shaft during removal is minimized.

A principal objective of this invention is to provide a reliable, simple and inexpensive device that easily and quickly removes embedded arrows from foam targets and other objects without causing damage either to the arrowhead or shaft.

Another objective of the invention is to provide an arrow extractor that utilizes a clamp and lever action requiring less force than that required to remove the embedded arrow by grasping and pulling it out manually.

Another goal is a new and improved device for withdrawing arrows which possess completely embedded arrowheads from foam targets and the like.

Yet another objective is an arrow extractor that provides an easy means of gripping the arrow shaft for removal of the embedded arrow from a target object.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced. All publications cited are hereby incorporated by reference in their entirety herein.

DESCRIPTION OF THE PREFERRED EMBODIMENT OF THE INVENTION

The present invention features a unique clamp and lever structure that enables one to easily and quickly extract an embedded arrow from foam targets and other objects while utilizing less force than by grasping and pulling it out manually.

Figure 1:
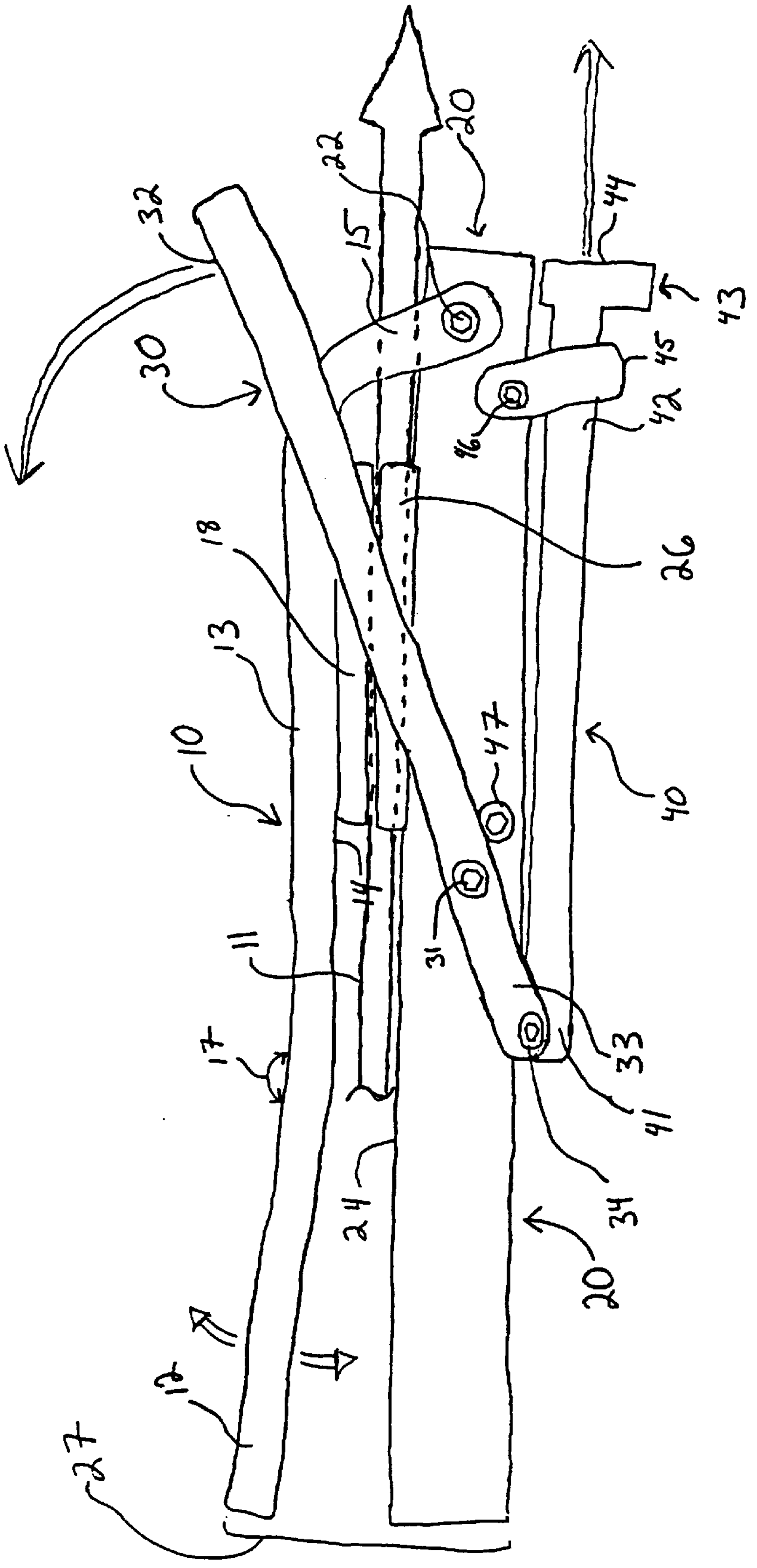
FIG. 1 is a side elevation view of the preferred embodiment showing the clamping means of the invention in a slightly opened position and the push ram retracted.

Referring to the drawings, wherein like parts are designated throughout with like numerals, FIG. 1 illustrates in side elevation view an arrow extractor device 1 according to the invention. The device 1 includes a shaft clamp lever 10 with a proximal gripping end 12, a central portion 13 having a bottom surface 14, and an engaging end 15.

To assist the user in grasping an arrow shaft 11, the arrow shaft clamp lever 10 can include a modified distal gripping end 12 that extends upwardly away from the plane of the central portion 13 at a predetermined angle. For example, bending the gripping end 12 of clamp lever 10 to an angle 17 of about 170 degrees will assist with manual engagement of an arrow shaft by providing ample space for hands of different sizes to grasp the gripping end 12. Fixedly positioned on the bottom surface 14 of the central portion 13 is an upper arrow-shaft holder 18.

Figure 3:
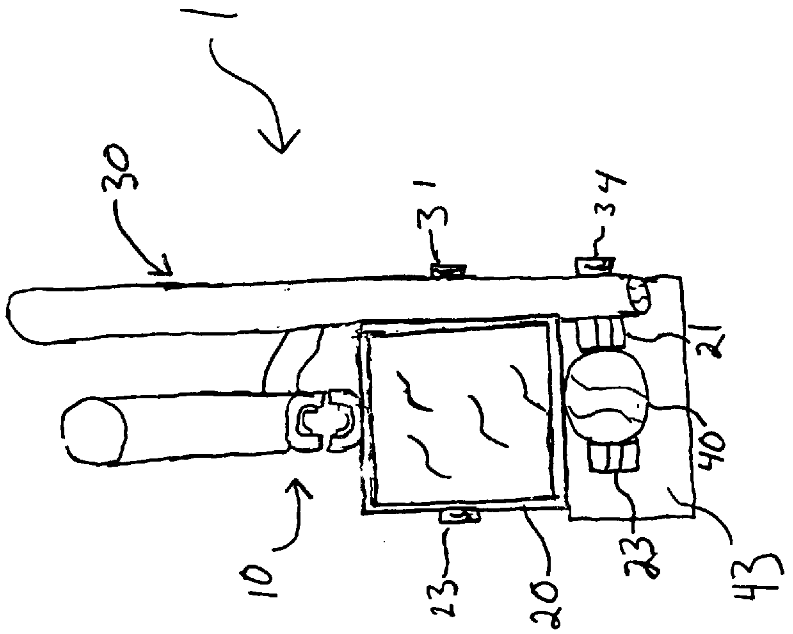
FIG. 3 is a rear elevation view of the device illustrated in FIG. 2.
Figure 2:
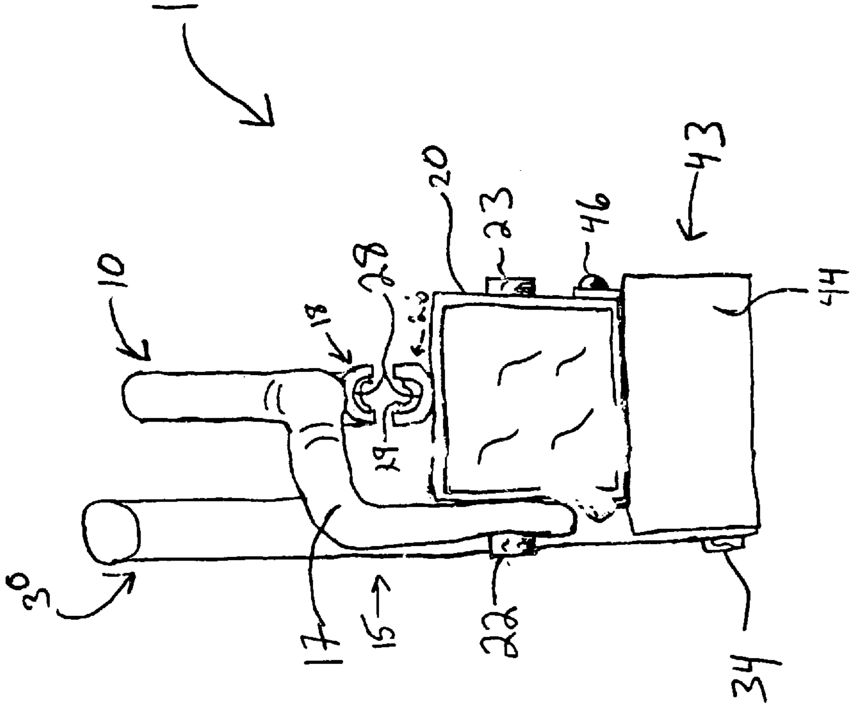
FIG. 2 is a front elevation view of the device of FIG. 1.

The arrow-shaft clamp lever 10 has an engaging end 15 hingedly connected to a support member 20 through a clamp lever pivot bolt 22, which can be held in place by a fastening means such as a nut 23 (not shown in this view; see FIGS. 2 and 3). The support member 20 has an upper surface 24 to which is fixedly positioned a lower arrow-shaft holder 26.

The arrow shaft holders 18 and 26, along with the arrow-shaft clamp lever 10 and support member 20, together form an arrow-shaft clamping means 27. In the preferred arrangement, the holders 18 and 26 are disposed oppositely facing according to predetermined measurements, preferably between the center portion 13 and the engaging end 15 of clamp lever 10. The two arrow shaft holders 18 and 26 consist of channels with a concave surface 28 (see FIG. 2) to which preferably is attached a gripping means 29, such as a rubber lining. Other clamping means capable of securely gripping an arrow shaft may be substituted for the preferred embodiment described above. For example, see the gripping device of U.S. Pat. No. 5,546,621.

Application of downward pressure on the distal gripping end 12 of the arrow shaft clamp lever 10 causes the lever 10 to pivot downwards against the support member 20, bringing the arrow shaft clamping means 27 into contact with, and thereby gripping, an arrow shaft 11. The lever action of the clamp lever 10 amplifies the gripping force acting upon the arrow shaft positioned between the arrow shaft holders 18 and 26.

With further reference to FIG. 1, a ram push rod lever 30 is attached at a predetermined point to the supporting member 20 (e.g. in the middle as shown) by a lever pivot bolt 31. The ram push rod lever 30 has a lever gripping end 32 and a lever pivoting end 33. The lever pivoting end 33 is attached by a ram lever pivot bolt 34 to a ram push rod 40, which has a rod pivoting end 41 and a ram pushing end 42. Functionally, the ram push rod 40 and the ram push rod lever 30 cooperate to apply a pulling force to a target-embedded arrow clamped by the device 1. Attached to ram pushing end 42 is preferably a ram pad 43 having a pad face 44. The ram pad 43 reduces the pressure of the push rod 40 by enlarging the surface area that pushes against the target from which the arrow will be extracted.

A push rod alignment bracket 45, attached by a bolt 46 or the like to the supporting member 20, is preferably used to align the ram push rod 40 along the plane of the support member 20, thereby maintaining the ram push rod 40 in alignment during extension and retraction. A push rod lever stop bolt 47 may be mounted to support member 20 such that the lever 30 is stopped at a convenient, ready-to-use position.

While firmly holding the arrow shaft 11 in the arrow shaft clamping means 27, the operator grips the ram push rod lever 30 at the lever gripping end 32 and pulls it upwardly and rearwardly away from the target (as indicated by the large arrow), causing the ram push rod lever 30 to pivot on both the lever pivot bolt 31 and the ram lever pivot bolt 34. Thus the upward and rearward pulling action simultaneously causes a pivoting action at the lever pivoting end 33 attached to the ram push rod 40 at the rod pivoting end 41. The pivoting actions so caused force the ram push rod 40 to extend forwardly beyond the support member 20, with the push rod alignment bracket 45 maintaining the ram push rod 40 movement in alignment (i.e. roughly parallel) with the arrow 11.

The forward thrusting extension of the ram push rod 40 forces the pad face 44 of the ram pad 43 against the target. As the operator continues to apply upward and rearward pulling action to the lever gripping end 32 the ram push rod 40 applies and amplifies forward linear thrust against the target to extract the arrow by means of an amplified rearward substantially linear pulling force acting on the arrow at the shaft where it is gripped by the arrow shaft clamping means 27.

Turning to FIG. 2, a frontal view of the inventive device 1 is depicted. In this view, the concave channel structure of the arrow shaft holders 18 and 26 is more clearly seen. Also more clearly shown is the rectangular structure of the preferred ram pad 43. As is well understood by those skilled in the art, the engaging end 15 of the clamp lever 10 is offset from the central portion 13 and the gripping end 12 in order to provide clearance for the arrow shaft gripped between the two arrow shaft holders 18 and 26. In In FIG. 3, a rear view of the inventive device 1 is pictured. From this view, the structural relationship between the ram push rod lever 30 and the push rod 40 is shown in detail. The push rod lever 30 is pivotally attached to the push rod 40 by virtue of a bolt 34 and nuts 21. Thus, by pulling the rod lever 30 toward the user, push rod 40 is actuated toward the target.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. An arrow extraction device for removal of an arrow embedded in an object, wherein the arrow comprises an arrowhead attached to an arrow shaft, comprising:

an arrow-shaft clamping means a push rod, and a lever member coupled to the arrow-shaft clamping means and the push rod such that a pulling force applied to the lever member urges the push rod in a direction away from the arrow-shaft clamping means;

wherein the arrow-shaft clamping means comprises a first arrow-shaft holder attached to a first arrow-shaft clamp lever, and a second arrow-shaft holder attached to a second arrow-shaft clamp lever that is hinged to the first clamp lever, both holders being disposed in a configuration suitable for clamping an arrow shaft.

2. The device of claim 1, wherein an alignment means is disposed around the push rod to maintain the push rod in substantial alignment with the arrow shaft.

3. The device of claim 2, wherein the alignment means comprises a bracket.

4. The device of claim 1, wherein the push rod further includes a pad at a pushing end of the push rod.

5. The device of claim 1, wherein the alignment means comprises a bracket.

6. An arrow extraction device for removal of an arrow embedded in an object, wherein the arrow includes arrowhead attached to an arrow shaft, comprising:

a support member, an arrow-shaft clamping means hingedly connected to the support member, a lever member pivotally attached to the support member, and a push rod pivotally attached to a first end of the lever member such that a pulling force applied to a second end of the lever member actuates said push rod away from said arrow-shaft clamping means;

wherein an alignment means is disposed around the push rod to maintain the push rod in substantial alignment with the arrow.

7. It The device of claim 6, wherein the alignment means comprises a bracket.

8. The device of claim 6, wherein the arrow-shaft clamping means comprises a first arrow-shaft holder attached to an arrow-shaft clamp lever, and a second arrow-shaft holder attached to the support member, both holders being disposed in a configuration suitable for clamping an arrow shaft.

9. The device of claim 6, wherein the push rod further includes a pad at a pushing end of the push rod.

10. A method of extracting an arrow embedded in an object, wherein the arrow includes an arrowhead attached to an arrow shaft, comprising the steps of:

(a) providing an arrow extraction device including an arrow-shaft clamping means, a push rod, and a lever member coupled to the arrow-shaft clamping means and push rod, such that a pulling force applied to the lever member urges the push rod in a direction away from the arrow-shaft clamping means, (b) clamping the arrow shaft with the arrow-shaft clamping means, and (c) applying a pulling force to the lever member, thereby actuating the push rod to achieve extraction;

wherein the arrow-shaft clamping means of step (a) comprises a first arrow-shaft holder attached to a first arrow-shaft clamp lever, and a second arrow-shaft holder attached to a second arrow-shaft clamp lever that is hinged to the first clamp lever, both holders being disposed in a configuration suitable for clamping an arrow shaft.

11. The method of claim 1, wherein the push rod of step (a) further includes a pad at a pushing end of the push rod.

12. The method of claim 10, wherein an alignment means is disposed around the push rod of step (a) to maintain the push rod in substantial alignment with the arrowshaft.

13. The method of claim 10, wherein the alignment means comprises a bracket.

* * * * *